United States Patent [19]
Lutz

[11] Patent Number: 4,501,930
[45] Date of Patent: Feb. 26, 1985

[54] TELEPRINTER

[75] Inventor: Roman Lutz, Munich, Fed. Rep. of Germany

[73] Assignee: Siemens Aktiengesellschaft, Berlin & Munich, Fed. Rep. of Germany

[21] Appl. No.: 476,557

[22] Filed: Mar. 18, 1983

[30] Foreign Application Priority Data

Apr. 8, 1982 [DE] Fed. Rep. of Germany ....... 3213290

[51] Int. Cl.³ .................... H04L 21/02; H04L 21/04
[52] U.S. Cl. ............................................ 178/4; 178/3
[58] Field of Search ................ 178/4, 3, 17 R, 17 A, 178/17 C, 17.5, 23 R, 25, 26; 340/750, 748, 744, 758

[56] References Cited

U.S. PATENT DOCUMENTS 4,212,077 7/1980 Vittorelli ............................. 364/200
4,244,031 1/1981 Izushima et al. .................... 364/900

FOREIGN PATENT DOCUMENTS 2806121 7/1979 Fed. Rep. of Germany.
2823175 11/1979 Fed. Rep. of Germany.

Primary Examiner—Stafford D. Schreyer
Attorney, Agent, or Firm—Hill, Van Santen, Steadman & Simpson

[57] ABSTRACT

A teleprinter has a printer for printing received or manually entered characters in a row-by-row fashion. The characters of a row are initially stored, and only following the occurrence of a predetermined control signal, for example a "carriage return" signal, are all of the characters of the pending row printed. The teleprinter has a display unit for displaying at least a portion of those characters of a row which have not yet been printed. The display unit may also display at least one preceding and at least one following row in addition to the row being printed.

11 Claims, 2 Drawing Figures

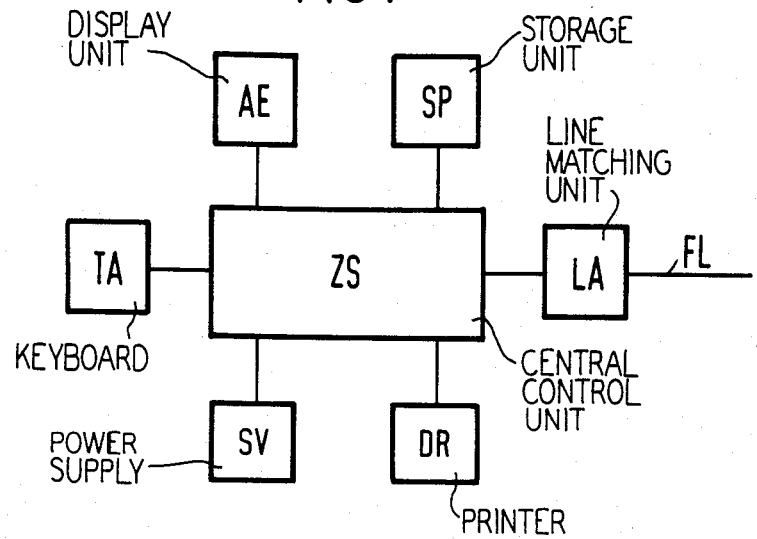
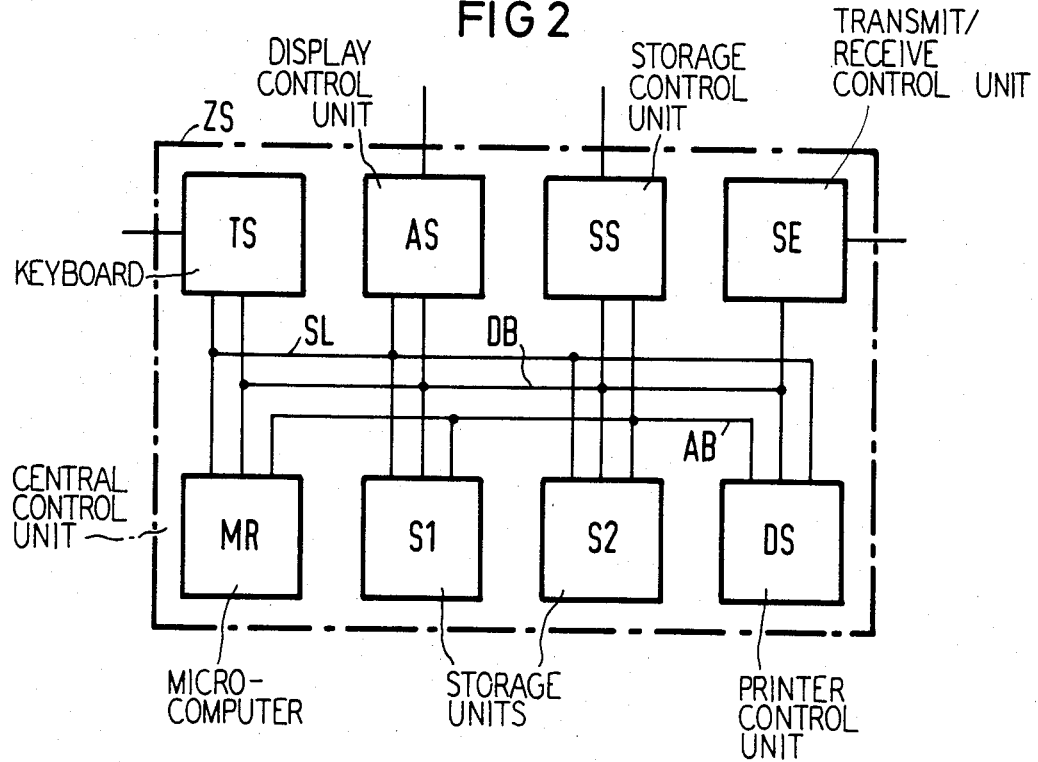

TELEPRINTER

BACKGROUND OF THE INVENTION

1. Field of the Invention

The present invention relates to teleprinters for automatically printing alphanumeric characters.

2. Description of the Prior Art

Teleprinters are known which facilitate both the setting up of texts composed of characters in local operation and also the remote transmission of these texts. Such teleprinters generally consist of at least one input unit, a central control unit, a line-matching unit which establishes the connection of the teleprinter to a trunk line, and at least one output unit and a current supply unit. The input unit generally consists of a keyboard or a punched strip reader whereas the output units generally consist of a printer and a punched strip puncher. In more recent teleprinters, a display unit which may be, for example, a cathode ray tube is additionally provided by way of output unit. A floppy disk store is also provided which can be used both as an input unit and as an output unit and which is capable of replacing punched strip devices.

For transmission purposes the teleprinter characters are coded in accordance with international telegraph alphabet No. 2 and are provided with start- and stop-elements. The synchronization between the transmitting and receiving teleprinters is effected in that each transmitted character serves to re-start the printer in the receiving teleprinter. The printer remains in the column of the last character to have been printed or in the next column and waits for the reception of the next character. This applies particularly when characters are input by means of the keyboard at a low input speed.

The start-stop operation imposes considerable demands on the units which operate character-by-character, in particular on the printer. During the time between two received characters the printer must accelerate and then deccelerate at the print-out position. In the case of type printing, for example using a type-wheel, the printer must be brought to a halt even before print-out. Following the print-out of the last character it is also frequently necessary to position the printer in such manner that having been printed the last character can be read by the operator. Finally it is also necessary to carry out a carriage return step and a character feed step, i.e. to bring the printer from the end of the row into the starting position of the next row during the time between two received characters.

In this mode of operation which is common in teleprinters, for a short period of time and a very large amount of energy is required to move the printer and the mains component of the teleprinter must possess high power reserves for this mode of operation. In addition large motors are needed in order to be able to carry out the movements of the printer at sufficient speed. Finally very considerable requirements exist in respect of mechanical accuracy. The overall consequence is that teleprinters designed for start-stop operation necessitate a relatively large outlay and the production costs are correspondingly high.

SUMMARY OF THE INVENTION

It is an object of the present invention to provide a teleprinter which necessitates a low outlay and which nevertheless is capable of carrying out all the functions required of a teleprinter.

The above object is inventively achieved in a teleprinter having a printing unit for row-by-row printing of characters and which, following the occurrence of a predetermined control signal, generates an output consisting of all characters within a row which have not yet been printed at the time of the control signal, the teleprinter also having a display unit on which characters comprising at least part of the pending row can be displayed before they are printed.

The teleprinter in accordance with the invention has the advantage that it necessitates a particularly low outlay and therefore can be produced cost favourably. The teleprinter can be produced with low mechanical requirements and on account of the exclusively row-by-row print-out is subject to low wear. If a mosaic printer is used, only a small motor is needed to move the printer in the direction of the rows since the printer accelerates only at the beginning of the row and must be deccelerated at the end of the row. When a thermo-printer is used it is possible to dispense with this motor if, as in known thermo-printers, the printing elements are arranged along the entire row. Since the printer is not provided for a character-by-character print-out of the characters, a very high printing speed can be achieved which means that a teleprinter of this type is suitable not only for the transmission of 50 bit/s but also for the transmission of 200 bit/s without the need for a considerably higher outlay.

The display unit can consist of one row or a plurality of rows. If it consists of one row, those characters within a row which have not yet been printed are displayed. If the display unit consists of two rows, in addition the preceding already printed row can also be displayed. In this case it is unnecessary to set up a visibility position following each print-out of a row on the printer. Furthermore, editing of a stored text is simplified since there are facilities for orientation in the text. This also applies when further rows are to be able to be represented on the display unit. If the display unit comprises a few rows, it proves expedient that it should take the form of a liquid crystal display or a vacuum fluorescence display. When a plurality of rows are provided it is favourable that the display unit should be constructed using a cathode ray tube. If the display unit is designed as a liquid crystal display and comprises only a few rows, it can form one structural unit together with a keyboard of the teleprinter which can be erected apart from the printer and be connected thereto only via a cable. It is also conceivable to arrange the liquid crystal display on the front side of the printer or in the vicinity of the print-out position.

The control signal, following the reception of which the characters of a row are printed-out, can consist for example of a signal which is assigned to the characters "carriage return" "line feed" or "new line". It is also expedient to produce the control signal if no further characters are received during a predetermined period of time which for example is assigned to the reception of four characters. In this case all the existing characters in the row are printed out and the printer subsequently returns to the starting position. If further characters arrive, these are continuously printed within a row and again the printer accelerates only at the beginning of the row and moves continuously to the appropriate print-out position. This mode of operation proves expedient in particular when dialogue operation is to be carried out by means of the keyboard.

BRIEF DESCRIPTION OF THE DRAWINGS

FIG. 1 is a block diagram of a teleprinter constructed in accordance with the principals of the present invention; and FIG. 2 is a block diagram of the central control unit for the teleprinter showing FIG. 1.

DESCRIPTION OF THE PREFERRED EMBODIMENTS

The teleprinter illustrated in FIG. 1 contains a microcomputer-controlled central control unit ZS the function of which is to determine data transmission paths between input units and output units and to transmit the data. It also serves to carry out device control and monitoring functions. The internal data exchange is carried out via data busses. The input units consist of a keyboard TA and a store SP which can consist of a punched strip reader and punched strip puncher, of a floppy disk device, or of a magnetic bubble store. The output unit can consist of a display unit AE, a printer DR and likewise a store SP. The display unit AE can comprise a one-row or multiple-row liquid crystal display or a screen. The printer DR likewise represents a row-by-row printer which either contains a mosaic printing mechanism and prints out the characters during a continuous movement of the printing mechanism or else contains a thermo-printing mechanism wherein the printing elements are distributed over the entire printing row. In each case the characters are printed row-by-row. Following the arrival of a control signal, all the characters of a row which have not yet been printed by this time are printed out. This control signal consists for example of a signal assigned to the control character "carriage return" "line feed" or "new line". It is also conceivable, in particular for dialogue operation, to print the characters of a row whenever no further characters arrive after a last character for a predetermined period of time. In this case the printing mechanism is returned to the starting position prior to the print-out of the next character. In the case of the mosaic printing mechanism this represents the left-hand row margin and in the case of the thermo-printer it is a question of moving back the data carried by one row. Then the following characters of the row are printed.

The characters of a row are firstly stored in an information store and are not transmitted to the printer until the control signal has been received. The information store consists either of the store SP or of a further store, for example a semiconductor store in the central control unit ZS. It is also possible to store a complete item of information in the information store which means that by using the display unit AE it is possible to edit the text before it is output on the printer DR or is transmitted to a receiving station via a line matching unit LA and a trunk line FL.

If the display unit AE is capable of accommodating fewer characters than one row, the newly input characters are represented at the right-hand margin of the display unit AE whereas the earliest characters are expelled at the left-hand margin. In order to simplify the editing and correcting facilities it is expedient that the display unit AE should comprise a plurality of characters. In this case at least one preceding and at least one following row can be represented and in the current row the individual characters can be characterized by means of a write mark.

If the display unit AE contains a relatively small number of rows and consists of a liquid crystal or vacuum fluorescence display, the display unit AE can be arranged on the keyboard TA in such manner as to form a structural unit therewith and can be set up apart from the printer DR. In order to avoid reflections the display unit AE can also be pivotable although it can also be arranged on the front side of the printer DR. This proves expedient in particular when the teleprinter consists of a pure output device. Apart from the characters the display unit AE can also display items of operator and/or control information, such as for example the store positions which remain free or the clock time.

In addition to the aforementioned units, a current supply unit SV is also connected in known manner to the central control unit ZS.

The central control unit ZS illustrated in FIG. 2 contains a micro-computer system which consists of a microcomputer MR, a read-only store S1 a write-read store S2 and a bus system. The bus system contains a data bus, an address bus and a plurality of control lines. The busses are connected to a keyboard control ST which is itself connected to the keyboard TA. The busses are also connected to a display control unit AS to which the display unit AE is connected, to a store control unit SS to which the store SP is connected, to a transmitting/receiving control unit SE to which the line matching unit LA is connected, and to a printer control unit DS which is connected to the printer DR. When characters are input by means of the keyboard TA, these are fed via the keyboard control unit TS under the control of the micro-computer system into the store S2 which normally consists of a semiconductor store and simultaneously serves as information store and as editing store. In contrast the store S1 serves as a program store and this store itself, or the store S2, can store items of data assigned to the various variants and/or the code which is exchanged following a connection establishment between the subscribers. The input characters are fed in local operation via the display control unit AS to the display unit AE. When a liquid crystal display is used, the display control unit AS contains a parallel-series converter which converts the coded characters which occur in parallel form on the data bus into series coded characters in order to minimize the number of lines leading to the display unit AE. The items of data can be stored simultaneously in the store SP and with this purpose are fed to the store control unit SS which cooperates with the micro-computer system by direct store access (DMA).

If the characters are to be transmitted to a remote subscriber, these are fed via the transmitting/receiving control unit SE and the line matching unit LA to the trunk line FL. Beforehand it is of course necessary to establish the connection in known manner including the exchange of codes. The characters are not printed until the control signal occurs. If, at the end of the row, the control character "carriage return" has been given, the characters are fed from the store S2 via the printer control unit DS to the printer DR by which they are continuously printed in the case of a mosaic printer for example a needle printer, and are simultaneously printed in the case of a thermo-printer.

If characters are received by a remote station, these are likewise fed to the store S2 via the line matching unit LA and the transmitting-receiving control unit SE.

From the store S2 they are fed via the display control unit AS to the display unit AE and possibly are simultaneously fed via the store control unit SS to the store SP. If the control signal is produced in the central control unit, for example because the "carriage return" character has been received, all the characters within a row received by this time are fed via the printer control unit DS to the printer DR where they are printed out. At the same time the printed characters in the display unit AE are erased. Similar applies if, during dialogue operation, characters have been input for example by keyboard operation and no further characters are received for a predetermined period of time which is assigned for example to the transmission duration of four characters. In this case, using the micro-computer MR, a time signal is produced by way of control signal and all the characters of the row which have not yet been printed by this time are printed on the printer DR. The printer DR subsequently reassumes its starting position. In the case of a needle printer this consists of the left-hand margin. If further characters arrive these too are represented on the display unit AE and following the occurrence of a further control signal the characters which have not yet been printed by this time are printed. In the case of a needle printer print-out is prevented at the positions at which characters have already been printed by the representation of blank characters and the print-out of the characters commences with the characters which have not yet been printed. In the case of a thermo-printer the data carrier is moved back by one row and those printing elements are operated which are assigned to the characters which have not yet been printed. Also in this case the control signal can represent a time-dependent signal or the signal for "carriage return".

In the information store, all the characters of the row which have already been printed can be provided with a marker bit and on the occurrence of the control signal only those characters of the rows which do not contain this marker bit are printed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A teleprinter for input/transmission and/or reception and output of characters representing graphic characters, said characters being coded by teleprinter symbols and each being provided with start and stop elements and being transmitted in accordance with the start-stop operation, said teleprinter comprising a storage means for storing characters of at least one row, and a printer for printing out said graphic characters, said printer printing said characters exclusively row-by-row and returning to a start position before each printout of characters, a means for controlling operation of said printer such that after the occurrence of a predetermined control signal generated whenever no characters are entered or received during a predetermined period of time, said printer generates an output consisting of all characters within a row which have not yet been printed at the time of said control signal, and a display unit for displaying graphic characters comprising at least a portion of a row to be printed before said graphic characters are printed.

2. A teleprinter as claimed in claim 1 wherein said printer is a mosaic printer operating exclusively in continuous fashion.

3. A teleprinter as claimed in claim 1 wherein said printer is a thermo-printer.

4. A teleprinter as claimed in claim 1 wherein said display unit displays only one row of said graphic characters.

5. A teleprinter as claimed in claim 1 wherein said display unit displays a plurality of rows including at least one row preceding said row to be printed.

6. A teleprinter as claimed in claim 1 wherein said display unit displays a plurality of rows including at least one row preceding said row to be printed and at least one row following said row to be printed.

7. A teleprinter as claimed in claim 1 wherein said display unit is a liquid crystal display unit.

8. A teleprinter as claimed in claim 1 wherein said display unit is a cathode ray tube.

9. A teleprinter as claimed in claim 1 wherein said teleprinter further comprises a keyboard, and wherein said display unit and said keyboard are combined in a unitary component.

10. A teleprinter as claimed in claim 1 wherein said control signal is generated by a control character identifying the end of a row.

11. A teleprinter as claimed in claim 1 wherein said display unit displays operating and control information relating to the operation of said teleprinter.

* * * * *